United States Patent
Lubowitz et al.

[15] 3,647,529
[45] Mar. 7, 1972

[54] REINFORCED STRUCTURAL PLASTICS

[72] Inventors: Hyman R. Lubowitz, Redondo Beach; William P. Kendrick, Manhattan Beach; John F. Jones, Torrance; Richard S. Thorpe, Costa Mesa; Eugene A. Burns, Palos Verdes Estates, all of Calif.

[73] Assignee: TRW Inc., Redondo Beach, Calif.

[22] Filed: July 10, 1967

[21] Appl. No.: 651,972

[52] U.S. Cl. ..............117/161 UN, 117/126 GR, 117/132 B, 260/78 TF
[51] Int. Cl. .........................................C03c 25/00
[58] Field of Search..............117/126 GR, 161 UN, 126 AB; 260/78 TF

[56]  References Cited

UNITED STATES PATENTS

| 2,421,024 | 5/1947 | Frosch | 260/78 TF |
| 2,944,993 | 7/1960 | Brebner | 260/78 TF |
| 3,234,181 | 2/1966 | Olivier | 260/78 TF |
| 3,423,431 | 1/1969 | Starr et al. | 260/78 TF |

*Primary Examiner*—Alfred L. Leavitt
*Assistant Examiner*—Janyce A. Bell
*Attorney*—Daniel T. Anderson, James V. Tura and Alan D. Akers

[57] ABSTRACT

This invention relates to reinforced polyimide structures. Reinforcing materials are impregnated with a suspension of polyimide prepolymer and bonded together by heat and pressure to form a cured, hard-reinforced, polyimide structure.

6 Claims, No Drawings

REINFORCED STRUCTURAL PLASTICS

The invention described herein was made in the performance of work under a NASA contract and is subject to the provisions of Section 305 of the National Aeronautics and Space Act of 1958, Public Law 85-568 (72 state 435; 42 U.S.C. 2457).

Reinforced polyimide structures exhibit outstanding physical properties in the presence of high temperatures. Where high strength is necessary at elevated temperatures, for example as in leading edges for aircraft or nose cones for space vehicles, reinforced polyimide structures provide excellent construction materials. Limitations as to their use, however, arise from problems resulting from difficult processing techniques.

Reinforced polyimide articles are currently produced by impregnating sheets of fibrous material with a polyamide acid produced by a condensation reaction of an anhydride and a polyfunctional amine. Materials impregnated with this polyamide acid must be hermetically sealed, refrigerated, and kept in solution, if final cure is not effected within a short time. When the final product has been formed, a cure of between 5 and 10 hours is necessary to produce a polyimide from the polyamide acid. During the cure, special processing is necessary to allow for the escape of appreciable volatile matter, mainly water. Failure to allow for these volatiles will produce an inferior structure containing interstitial bubbles and pockets.

It has now been discovered that reinforced polyimide articles can be produced using rapid-cure polyimide prepolymers. Preparation of the polyimide prepolymers and the polyimide polymers produced therfrom, are discussed in more detail in copending application Ser. No. 650,625, filed July 3, 1967, now U.S. Pat. No. 3,528,950. It is to be understood that the polyimides employed in this invention may be produced from the amines and anhydrides enumerated therein.

The amines which may be utilized for purposes of this invention to prepare the polyimides include the following:
para-phenylene diamine
meta-phenylene diamine
4,4'-diamino-diphenyl propane
4,4'-diamino-diphenyl methane
benzidine
4,4'-diamino-diphenyl sulfide
4,4'-diamino-diphenyl sulfone
3,3'-diamino-diphenyl sulfone
4,4'-diamino-diphenyl ether
1,5-diamino-naphthalene
3,3'-dimethoxy benzidine
2,4-bis (beta-amino-t-butyl)toluene
bis-(para-beta-amino-t-butyl-pheny)ether
bis-(para-beta-methyl-delta-amino-pentyl)benzene
bis-para-(1,1-dimethyl-5-amino-pentyl)benzene
1-isopropyl-2,4-metaphenylene diamine
m-xylylene diamine
hexamethylene diamine
heptamethylene diamine
octamethylene diamine
nonamethylene diamine
decamethylene diamine
diamino-propyl tetramethylene diamine
3-methylheptamethylene diamine
4,4-dimethylheptamethylene diamine
2,11-diamino-dodecane
1,2-bis-(3-amino-propoxy)ethane
2,2-dimethyl propylene diamine
3-methoxy-hexamethylene diamine
3,3'-dimethyl benzidine
2,5-dimethylhexamethylene diamine
2,5-dimethylheptamethylene diamine
5-methyl-nonamethylene diamine
2,17-diamino-eicosadecane
1,4-diamino-cyclohexane
1,10-diamino-1,10-dimethyl decane
1,12-diamino-octadecane
Triamines such as
1,3,5-triaminobenzene
2,4,6-triamino-s-triazine
1,2,3-triaminopropane
4,4'4''-triaminotriphenyl methane, and
4,4'4''-triaminotriphenylcarbinol.

Polyfunctional anhydrides employed in the production of the polyimide prepolymer according to this invention are generally dianhydrides although tri- and tetraanhydrides come within the scope of this invention. Polyfunctional anhydrides which have been found to be suitable in the practice of this invention are as follows:
pyromellitic dianhydride
benzophenone tetracarboxylic dianhydride
2,3,6,7-naphthalene tetracarboxylic dianhydride
3,3',4,4'-diphenyl tetracarboxylic dianhydride
1,2,5,6-naphthalene tetracarboxylic dianhydride
2,2',3,3'-diphenyl tetracarboxylic dianhydride
2,2-bis(3,4-dicarboxyphenyl)propane dianhydride
3,4,9,10-perylene tetracarboxylic dianhydride
bis(3,4-dicarboxyphenyl)ether dianhydride
ethylene tetracarboxylic dianhydride
naphthalene-1,2,4,5-tetracarboxylic dianhydride
naphthalene-1,4,5,8-tetracarboxylic dianhydride
decahydronaphthalene-1,4,5,8-tetracarboxylic dianhydride
4,8-dimethyl-1,2,3,5,6,7-hexahydronaphthalene-1,2,5,6-tetracarboxylic dianhydride
2,6-dichloronaphthalene-1,4,5,8-tetracarboxylic dianhydride
2,7-dichloronaphthalene-1,4,5,8-tetracarboxylic dianhydride
2,3,6,7-tetrachloronaphthalene-1,4,5,8-tetracarboxylic dianhydride
phenanthrene-1,8,9,10-tetracarboxylic dianhydride
cyclopentane-1,2,3,4-tetracarboxylic dianhydride
pyrrolidine-2,3,4,5-tetracarboxylic dianhydride
pyrazine-2,3,5,6-tetracarboxylic dianhydride
2,2-bis(2,3-dicarboxyphenyl)propane dianhydride
1,1-bis(2,3-dicarboxyphenyl) ethane dianhydride
1,1-bis(3,4-dicarboxyphenyl) ethane dianhydride
bis(2,3-dicarboxyphenyl)methane dianhydride
bis(3,4-dicarboxyphenyl)methane dianhydride
bis(3,4-dicarboxyphenyl)sulfone dianhydride
benzene-1,2,3,4-tetracarboxylic dianhydride
1,2,3,4-butane tetracarboxylic dianhydride, and
thiophene-2,3,4,5-tetracarboxylic dianhydride.

Reinforced articles of this invention employ polymeric bonding agents which may be reproduced from any polyimide which has an end-capping group produced by the reaction of a monoanhydride having the structure

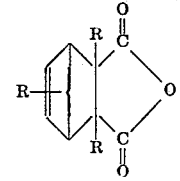

where R represents hydrogen, or a lower alkyl group, e.g., methyl, ethyl, propyl, butyl, or amyl.

Preparation of the reinforced polyimide articles is effected by impregnating reinforcing material with the polyimide prepolymer resin. After the impregnation, items may be stored in air for later use without special precautions. Final cure or bonding simply consists of arranging the impregnated reinforcement into the desired shape and then applying heat and pressure, whereupon a hard, strong reinforced article is formed.

The process in more detail consists of forming a suspension of powdered high molecular weight polyimide prepolymer resins in a solution of a low molecular weight polyimide prepolymer dissolved in a solvent. If desired, the soluble portion and viscosity of this suspension may be varied by heating. Details of the polyimide prepolymers may be obtained from the above-mentioned copending application. When a homogeneous suspension or dispersion of the polyimide prepolymer has been obtained, the mixture is applied to the reinforcing material. The mixture is generally applied by dipping and wiping or spraying however, other methods of application may be equally suitable under certain conditions. After the suspension has been applied to the reinforcement it is dried to remove some or all of the solvent, generally at elevated temperatures to reduce process time. Processing to the final form comprises bonding by heat and pressure. To accomplish this, the impregnated reinforcements are subjected to state-of-the-art processing procedures, such as pressed cure, vacuum bagging, autoclaving, hydroclaving, etc. An example of press cure laminates consists of subjecting stacked plies to elevated temperatures of around 450° to 600° F. and moderately high pressures of around 1,000 p.s.i. Because the low molecular weight polyimide prepolymer melts at a lower temperature to provide a fusable matrix for the high molecular weight polyimide prepolymer powder, a stepped pressure application is necessary. To prevent excessive resin flow, a 200 p.s.i. pressure is initially applied for 30 seconds or more, depending on the thickness of composite. This period of heat and moderate pressure is sufficient to advance the polyimide prepolymer so that it can withstand the final processing conditions.

The reinforcing materials may be selected from a wide variety of materials. The limiting factors on the reinforcing materials which can be used are defined by the strength of the material and its decomposition temperature. Thus materials which provide little physical strength or decompose at temperatures below the processing temperatures would not be preferable for reinforcing materials. Materials which are generally most suitable are carbon, such as carbon or graphite fibers, whiskers, or crystals; silicates, such as asbestos or fiber glass; or metals, such as metal turnings, wires, or whiskers. In addition refractory materials, such as fibers, whiskers, or crystals of borides, carbides, silicides, nitrides, or oxides are suitable.

In addition to the rapid processing characteristics of these polyimide reinforced structures they also exhibit outstanding physical properties. The following table shows the results of several tests using different polyimide compositions and different reinforcing materials.

TABLE

| Reinforcement | Temperature of test, ° C. | Polyimide high molecular weight fraction | Flexural strength, 10³ p.s.i. | Flexural modulus, 10⁶ p.s.i. |
|---|---|---|---|---|
| Style 181 E glass cloth. | 25 | 10 | 70.6 | 3.8 |
|  |  | 30 | 78.4 | 4.5 |
|  |  | 75 | 91.7 | 5.4 |
|  |  | 75 | 90.7 | 5.1 |
|  | 315 | 30 | 69.5 | 4.0 |
|  |  | 30 | 66.2 | 4.0 |
|  |  | ᵃ 75 | 50.6 | 4.1 |
|  |  | ᵃ 75 | 46.1 | 4.2 |
| Low alkalinity carbon cloth CCA-1 (1641). | 25 | 30 | 44.2 | 2.2 |
|  |  |  | 47.8 | 3.00 |
|  | 315 | 30 | 30.5 | 1.4 |

ᵃ Specimens aged at 315° C. for 100 hours prior to test.

This invention has provided a means for producing reinforced articles which utilizes the outstanding mechanical and thermal properties of the polyimide resins, but which may be produced in a fraction of the time that was required previously. Processing conditions for making reinforced polyimides have been greatly simplified by the stability of the polyimide prepolymers described in this invention, the reduced processing time, and the substantial reduction in the amount of volatiles expelled.

We claim:

1. A process for preparing a reinforced article which comprises impregnating a reinforcing material with a polyimide prepolymer; said prepolymer obtained by coreacting monoanhydride with a mixture of polyfunctional amines and dianhydrides; said monoanhydride having the structure

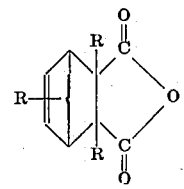

where R represents a member selected from the group consisting of hydrogen and lower alkyl radicals, and curing by the application of heat and pressure to form a reinforced article.

2. A process according to claim 1 wherein the lower alkyl radical is selected from the group consisting of methyl, ethyl, propyl, butyl, and amyl.

3. A process according to claim 1 wherein the reinforcing material is selected from the group consisting of carbons, silicates, carbides, silicides, borides, nitrides, oxides and metals.

4. A reinforced article comprising a reinforcing material bonded together by a cured polyimide resin wherein said resin is formed from an end-capped polyimide prepolymer; said prepolymer having an end-capping group derived from a monoanhydride having the structure

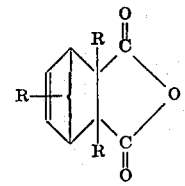

wherein R represents a member selected from the group consisting of hydrogen and lower alkyl radicals.

5. A reinforced article according to claim 4 wherein the fibrous reinforcing material is selected from the group consisting of carbon, silicates, borides, carbides, silicides, nitrides, oxides, and metals.

6. A reinforced article according to claim 4 wherein the lower alkyl radical is selected from the group consisting of methyl, ethyl, propyl, butyl, and amyl.

* * * * *